Figure 1:
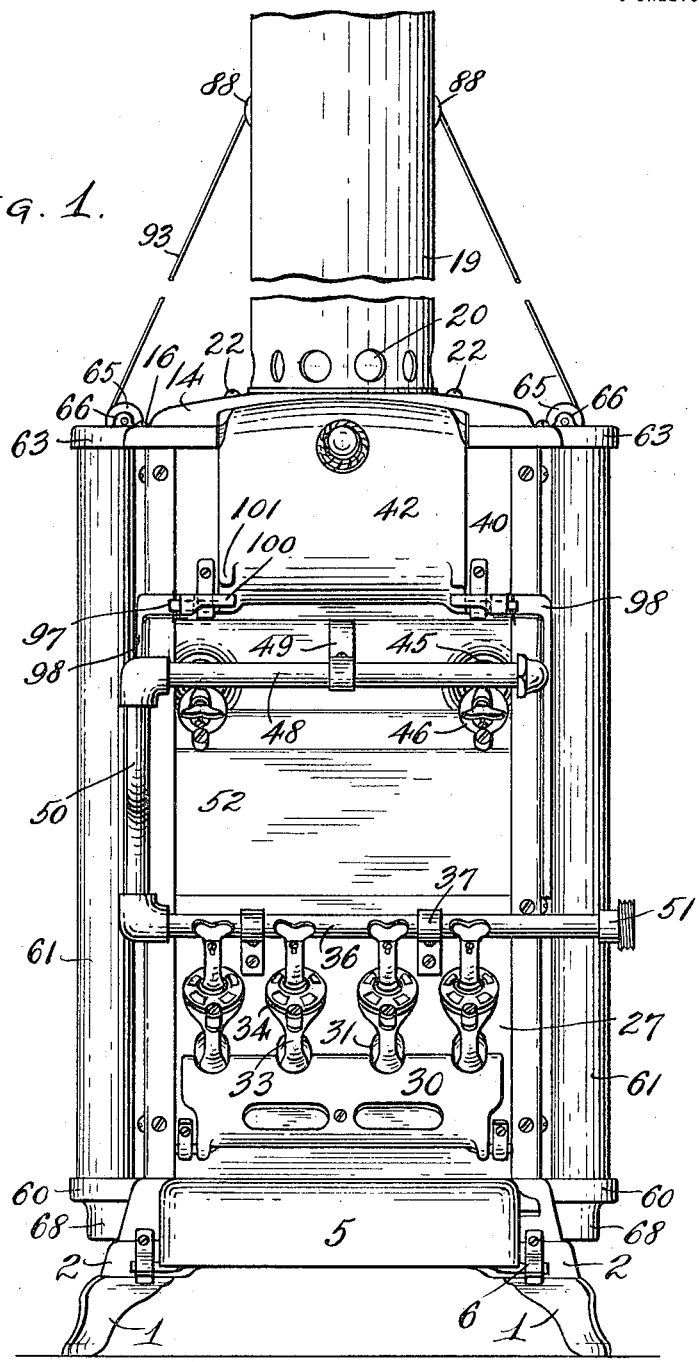

UNITED STATES PATENT OFFICE.

FRANK A. NIEBERDING, OF CLEVELAND, OHIO.

INCINERATOR.

1,235,918.  Specification of Letters Patent.  Patented Aug. 7, 1917.

Application filed August 27, 1914. Serial No. 858,788.

*To all whom it may concern:*

Be it known that I, FRANK A. NIEBERDING, a citizen of the United States, residing at Cleveland, in the county of Cuyahoga and State of Ohio, have invented a certain new and useful Improvement in Incinerators, of which the following is a full, clear, and exact description, reference being had to the accompanying drawings.

This invention relates to incinerators that are suitable for use in private homes, hotels, and such institutions as hospitals, asylums, and the like; and it has for its objects the provision of an incinerator that is very substantial and comparatively simple of construction; the provision of an incinerator that is highly efficient in its consumption of such refuse as wet garbage or analogous substances, it being both rapid and thorough in its operation; and the provision of an incinerator that can be more cheaply produced than incinerators now upon the market with which I am familiar.

A further object of the invention is to provide an incinerator that may be placed within a kitchen, if desired, and which, because of its peculiar construction, will not radiate any appreciable amount of heat to unduly heat up the room; and which will not emit fumes or odors.

In carrying out my invention, I provide an incinerator having a combustion chamber wherein the refuse to be destroyed is supported, in a column or mass, upon a plate or basin, or upon a suitable grate, above which the products of combustion from some such source as a gas burner are introduced into the chamber in direct contact with the mass of refuse; and because of the peculiar formation of the walls of the combustion chamber, the products of combustion are caused to traverse a tortuous course about the mass, following the contour thereof and continually licking its surface until they are liberated from the chamber, preferably through a flue extension which is capable of resting upon the top of the mass or column of refuse during the operation of the apparatus.

A more limited object of the invention is to provide means for automatically elevating the aforesaid flue extension to the top of the casing when the door of the incinerator is opened for the purpose of depositing a quantity of garbage or other refuse therein; and a still further object is to provide means for consuming the disagreeable odors that are liberated from the garbage, or for promoting a draft through the flue that will carry off such odors.

Under some circumstances it is more desirable to have the incinerator built into the wall of the building, where it is entirely out of the way and where its heating effect is reduced to a minimum, than to have it occupy space within a room; and for this reason I contemplate incorporating the features of my invention in a wall type of incinerator as well as in a portable type.

Figure 2:
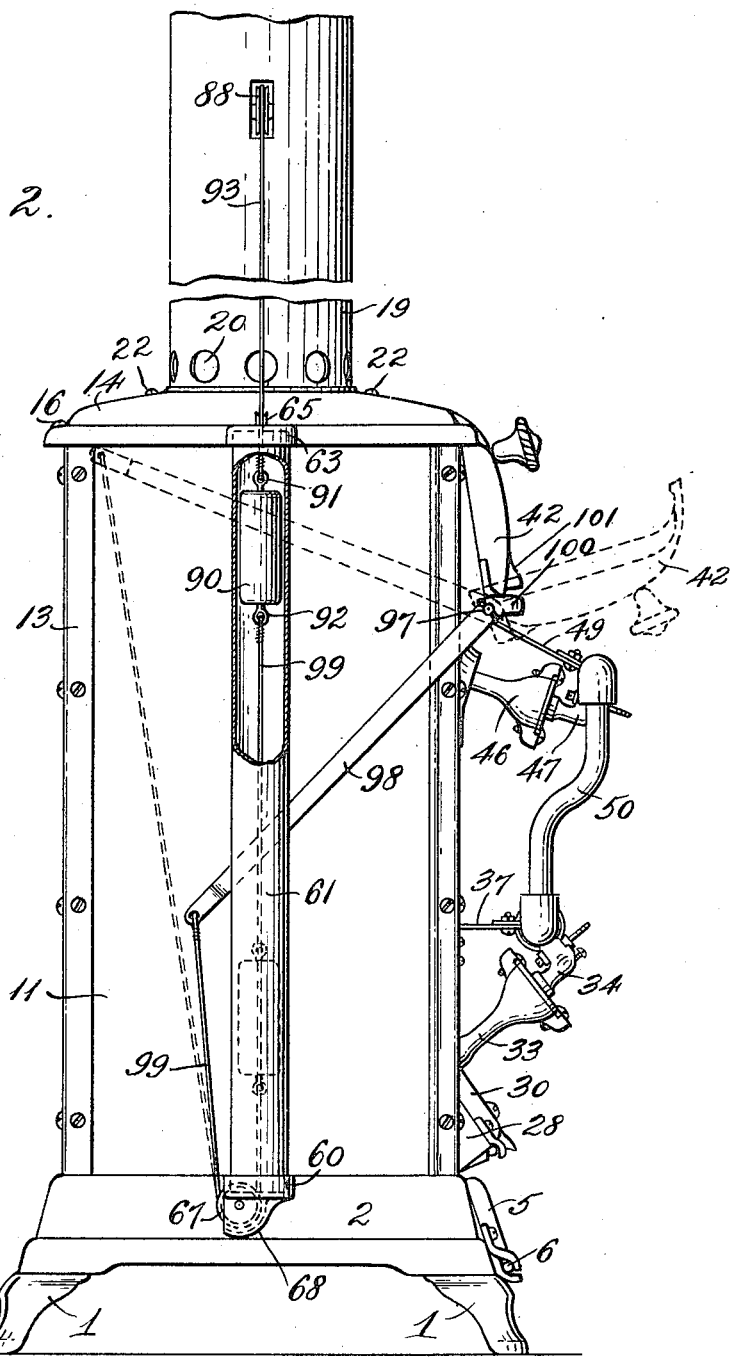
Figure 3:
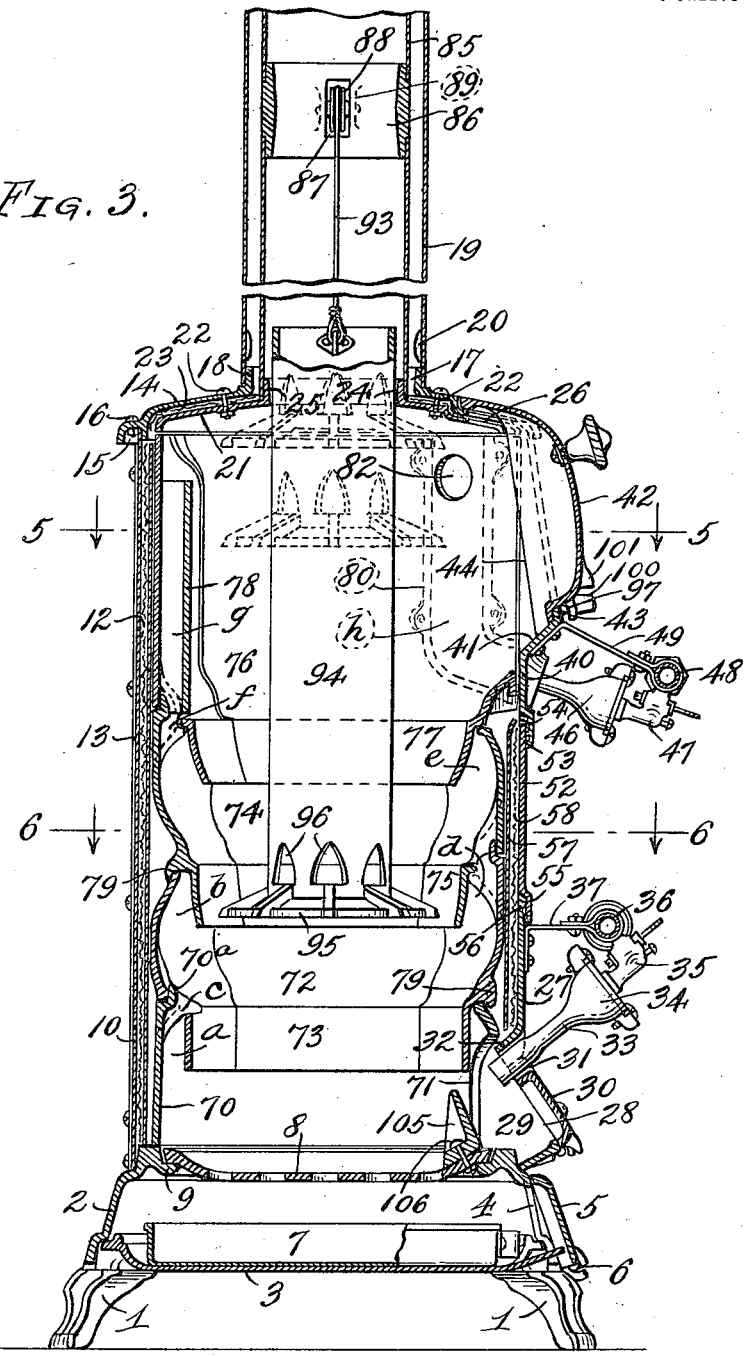
Figure 4:
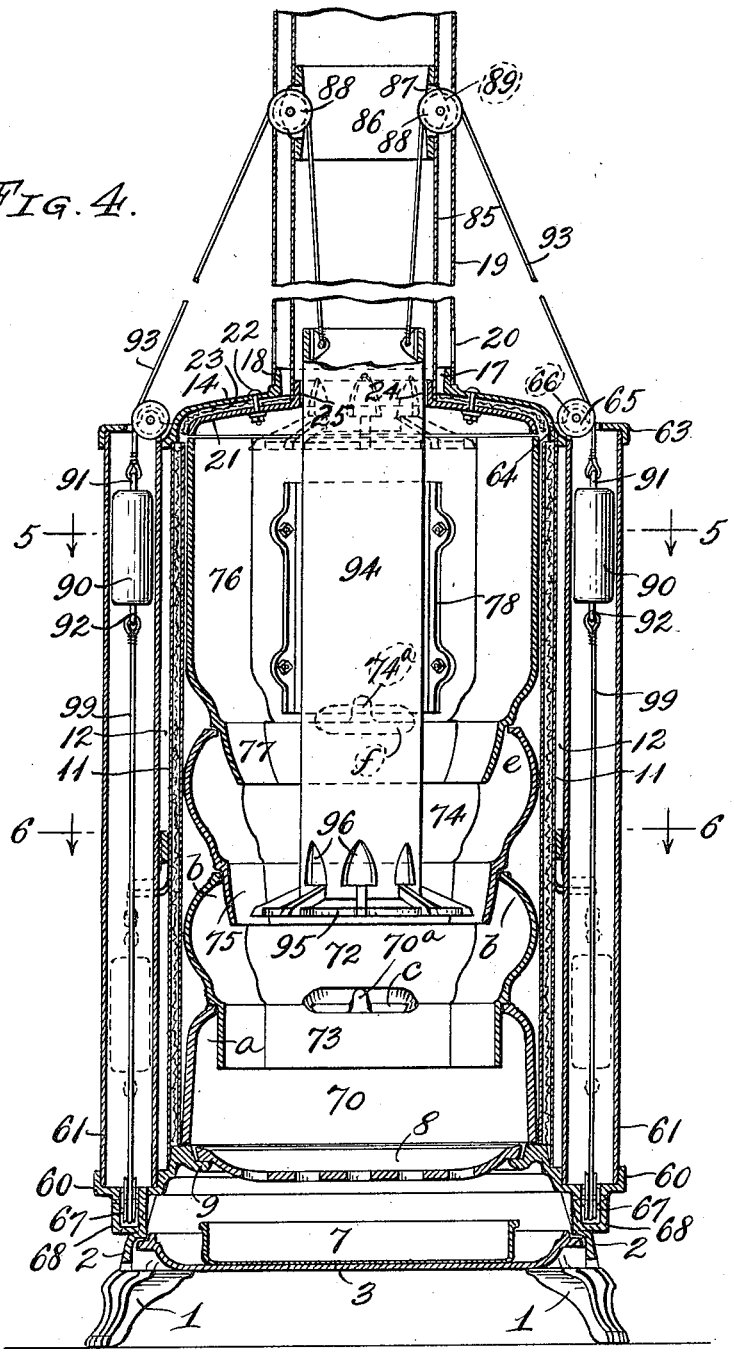
Figure 5:
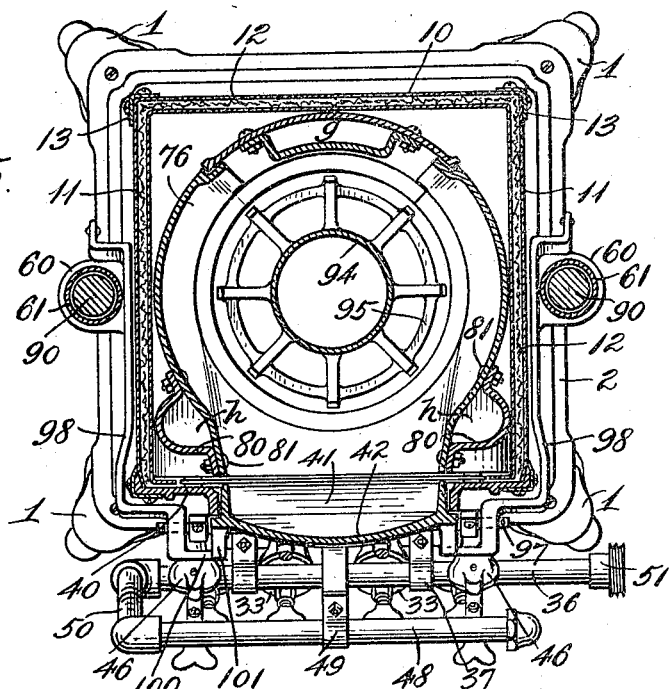
Figure 6:
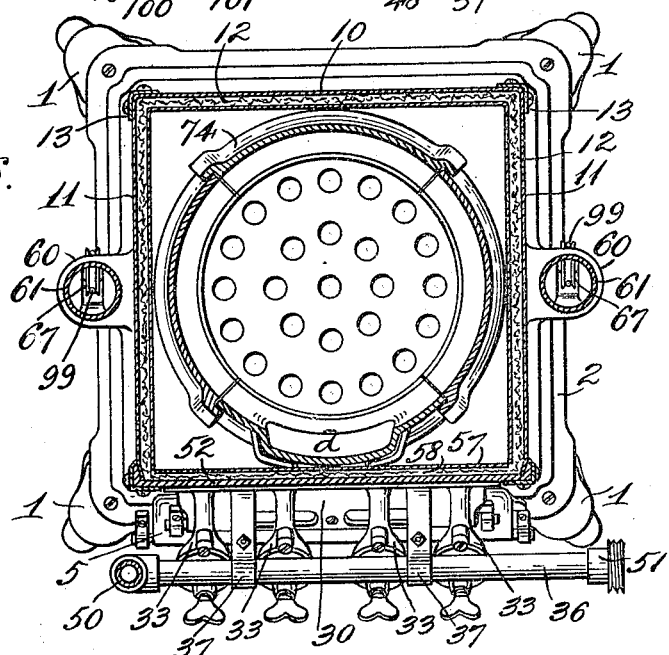
Figure 7:
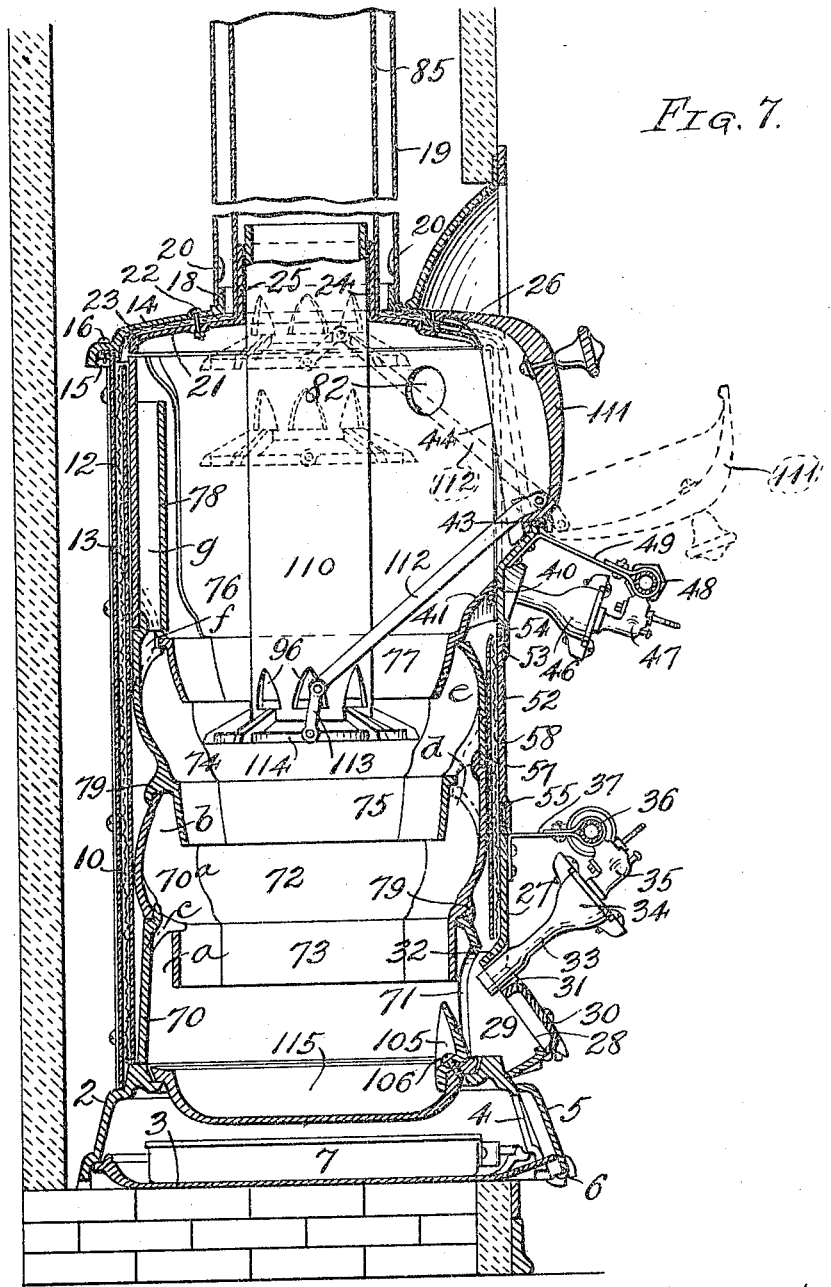

In the accompanying drawings I have illustrated my invention as embodied in an incinerator of a size especially suitable for use in private homes. Figure 1 represents a front elevation of an incinerator of the portable type, and constructed in accordance with my invention; Fig. 2 is a left hand side elevation of the same; Fig. 3 is a central vertical section through the incinerator on a plane parallel to the side elevation; Fig. 4 is a central vertical section through the incinerator on a plane parallel to the front elevation; Figs. 5 and 6 are horizontal sectional views on the lines 5—5 and 6—6, respectively, of Figs. 3 and 4; and Fig. 7 shows a modified form of my incinerator, the same being of the wall type.

The invention will now be described in detail by the use of reference characters. Supported a suitable distance above the floor, by legs 1, is a base 2 which consists, generally, of a substantially square frame that supports, adjacent its lower edge, a bottom plate 3, the parts being connected in any approved manner. The front side of the base is provided with an opening 4 that is adapted to be closed by a door 5 which is hinged at 6 to the base. An ash pan 7 is adapted to be inserted through the opening 4 and rest upon the bottom plate 3, in the position shown in the drawings. A perforated plate or basin 8 is supported within the top of the base 2, by a ledge 9 which projects inwardly from the upper edge of the base.

In the embodiment of my invention shown herein, the rear wall 10 and the side walls 11 of the casing of the incinerator are formed, each, of two parallel plates of metal, either or both of which may be of cast or sheet metal, between which is placed a layer of some suitable lagging material, such as asbestos, as shown at 12. It is found advisable to employ a single piece of metal for the outer plates of the rear and side walls, as well as for the inner plates of said walls as appears most clearly from Figs. 5 and 6; and each rear vertical corner of the casing may be strengthened by a corner stay 13 that consists of an angle strip which is secured, by screws, to said corner.

The incinerator is provided with a top 14 which has a peripheral, downwardly opening channel 15 for the reception of the upper, outturned edge of the outerplate of the rear and side walls 10 and 11, the top being secured to said plate by means of stove bolts 16. The top 14 is provided with a central flue opening 17 that is surrounded by a vertical flange 18 for the reception of the lower end of a flue or pipe 19. Means are provided for admitting air to the lower end of the flue or pipe 19, such being shown in the drawings as openings 20, which are located just above the flange 18. A sub-top 21, which is smaller but of substantially the same shape as the top 14, is supported below the latter by means of the stove bolts 22 and is separate therefrom by a layer of insulating or lagging material 23, the sub-top having a flue opening 24 that is surrounded by a flange 25, concentric with the flange 18 of the top 14. The central portions of the forward edges of the top and sub-top are cut away, as shown at 26.

The front wall of the casing is made up of a series of plates which are arranged in vertical sequence and extend laterally from the forward edge of one of the side walls 11 to the corresponding edge of the opposite side wall. The lowest of the plates is indicated at 27, and has its lower portion disposed at an angle with respect to its upper portion, as shown at 28, and an opening 29, which occupies the inclined portion, is adapted to be closed by a door 30. The upper edge of the door 30 comes at the junction between the vertical and inclined portions of the plate 27, and divided equally between the upper edge of the door 30 and the adjacent portion of the aforesaid plate, are openings 31. The metal of the door and the front plate, surrounding these openings, is turned inward to form tubular extensions 32 through which project the gas burners 33. These burners are of usual construction, having mixers 34, and they are connected, through the valves 35, with a manifold 36, supported by the brackets 37 from the front plate 27.

The plate 40 which forms the upper portion of the front of the casing is provided with an opening which extends downward from its upper edge and which registers with the cutaway portion 26 of the top of the incinerator. The portion of the plate surrounding the said opening is inclined outwardly as shown at 41. A door 42 is hinged at 43 to the plate 40, and is adapted to close the said opening and the cut-away portion 26. This opening together with the cut-away portion which are adapted to be closed by the door 42, are designated, generally, at 44, and will be referred to hereinafter as the filling opening. At each of its lower corners, the plate 40 is provided with an opening 45 through which projects a burner 46 that is identical to the burners 33, previously mentioned. The burners 46 have connection through the valves 47, with a manifold 48 that is supported by the bracket 49, which has its inner end connected to the inclined portion of the plate 40 beneath the door 42. The manifolds 36 and 48 are connected by a pipe 50, and the right hand end of the manifold 36 has a fitting 51 whereby it may be connected to a supply pipe.

An intermediate plate 52 extends between the upper edge of the plate 27 and the lower edge of the plate 40, and at its upper edge it has a bead 53 which is received by an inwardly opening channel 54 that is formed along the lower edge of the plate 40; and at its lower edge it has a channel 55, similar to the channel 54, which receives a bead 56 that extends along the upper edge of the plate 27. A plate 57 is spaced from the inner side of the plate 52 and extends from its upper edge some distance below the upper edge of the plate 27, and suitable insulating material 58 fills the space between the plate 57 and the adjacent plates 52 and 27.

Extending laterally from each side of the base 2, and preferably formed integral therewith, is a cup shaped boss 60, which receives the lower end of a tube 61, the upper end of each of the tubes 61 being contained within a cap 63 which projects from the corresponding edge of the top 14. A slot 64 is formed in the top of each cap 63, and a pulley 65 is journaled just above the slot between a pair of ears 66. A sheave 67 is journaled within a housing 68 which is formed integral with each of the lower cup shaped bosses 60, and each housing 68 is open on its rear side, as shown clearly in Fig. 2. The purpose of the tubes 61 will be made clear farther along in this description.

Within the bottom of the casing and resting upon the top of the base 2, is what I will term a lower shell 70, which is substantially cylindrical in form and which has its front side cut away at 71, for the admission of the ends of the burners 33. Resting upon the upper edge of the lower shell 70 is a lower, intermediate shell 72 the sides of which bulge outwardly between its upper and lower edges. The lower intermediate shell 72 has an extension 73 which projects downward into the lower shell 70, the sides of the extension 73 being parallel. An upper intermediate shell 74, which is of the same general shape as the shell 72, rests upon the upper edge of the lower intermediate shell, and has an extension 75 which projects downwardly thereinto; and the sides of the extension 75 converge toward its lower end. An upper shell 76 occupies the remaining portion of the casing and rests upon the upper edge of the upper intermediate shell 74; and this last mentioned shell is also provided with an extension, shown at 77, which projects downwardly into the upper intermediate shell 74. The sides of the extension 77 of the upper shell converge at a greater angle than do the sides of the extension of the upper intermediate shell. It will be seen from this description that the shells form what may be considered an inner casing and inclose what I have previously referred to as the combustion chamber of the incinerator. In manufacturing the incinerator, it is found preferable to make the upper and intermediate shells each of four segmental pieces, as clearly shown in Figs. 5 and 6.

I have previously called attention to the fact that the walls of the intermediate shells are bulged outwardly between their respective upper and lower edges, and it will be noted that the extensions of the various shells extend downwardly a considerable distance into the adjacent shell below. By reason of these two facts, annular passageways or flues are formed between the outer surfaces of the extensions and the inner surfaces of the upper portions of the lower and intermediate shells. The passageway or flue which is formed between the upper portion of the lower shell 70 and the extension 73 of the lower intermediate shell 72, and which I have designated $a$ in the drawings, communicates with the passageway or flue $b$, that is formed between the extension 75 of the upper intermediate shell 74 and the upper portion of the lower intermediate shell, through a port or opening $c$ that is formed in the lower intermediate shell 72 at the junction of its body portion with its extension 73. It will be noted that the port or opening $c$ is located at the rear side of the shell. A lug 70$^a$ will be observed as passing through the opening $c$, which lug projects from the upper edge of the lower shell 70. This lug assists in holding the parts in proper, relative position wherever another port or opening, similar to the port $c$, occurs, the same construction will be carried out, the particular lug involved, bearing the same reference character, with the exponent $a$, as the shell from which it projects. The passageway or flue $b$ has communication with the interior of the upper intermediate shell 74, through the port or opening $d$ which is located at the front of the incinerator, or diametrically opposite the opening $c$. The passageway or flue $e$, that is formed between the extension 77 and the upper portion of the upper intermediate shell 74, exhausts through the opening $f$, located at the rear of the incinerator, or diametrically opposite the port $d$, into a vertical flue $g$ that is formed between a portion of the rear wall of the upper shell 76 and a trough shaped member that is bolted to said rear wall, as shown clearly in Figs. 3 and 5. Depending from the lower edge of each of the intermediate shells, and located at suitable points therearound, are lugs 79 which extend over the upper edge of the next lower shell, to assist in holding the parts in correct relative position.

It will be seen from an inspection of Fig. 5, that the upper shell 76 is substantially cylindrical in form, and that its front side is open from its top edge to within a short distance of its lower edge; and that the metal adjacent the opening extends outwardly to the inner edge of the filling opening 44. Within each front corner of the casing, there is located a substantially L-shaped channel member 80, which extends substantially throughout the vertical extent of the upper shell 76, and is connected to said shell by stove bolts 81. Between each of the members 80 and the adjacent wall of the shell, is formed a flue $h$ which communicates at its upper end, with the interior of the shell, through one of the openings 82. The burners 46, previously mentioned, project into the lower ends of the members 80, and the products of combustion therefrom rise through the flues $h$ and enter the upper end of the combustion chamber through the openings 82. These burners provide the means for consuming the odors that are liberated within the incinerator, and act to promote a draft through the flue for the purpose of carrying off such odors.

Fitting upon the collar 25 of the sub-top 21 of the incinerator, is a flue or pipe 85 that is interrupted at a point, some distance above its lower end, for the insertion of a collar 86, having diametrically opposed openings 87 within which are journaled pulleys 88 between outwardly extending ears 89.

Within each of the tubes 61 there is a weight 90 from the upper and lower ends of which project eyes 91 and 92, respectively. Suitable flexible connecting members 93 represented in the drawings as wire cables, have their corresponding ends connected to the upper eyes 91 of the weights 90, and after passing up over the pulley 65 and the pulleys 88, that are carried by the collar 86, they have their opposite ends connected to the upper end of a flue extension 94 which is centrally located within the incinerator and which is adapted to reciprocate within the flue or pipe 85 and be guided through and by the collar 25. At its lower end, the flue extension is provided with a spider 95 that is of a diameter slightly less than the diameter of the extension 77 of the upper shell 76; and just above the spider 95 the extension is provided with a series of openings 96.

Pivoted upon the gudgeons or pintles 97 of the door 42 are a pair of arms 98, each of which extends rearwardly alongside the incinerator casing and between it and one of the tubes 61, and the free end of each of the arms is bent outwardly until it is in substantial alinement with the vertical center of the adjacent tube 61. A flexible connecting member 99 is attached to the free end of each of the arms 98 and extends downward and over the sheave 67 and then upward into the tube 61 to where it is connected to the lower eye 92 of the weight 90. Projecting forwardly from the pintle 97 is an extension 100 of the arm 98 which is located below a lug 101 that is carried by the door, there being a lug for each of the arms 98, as shown in Fig. 1.

Attention is invited to the form of burner which I employ in connection with my incinerator. As has been previously stated, the burner itself is of ordinary type, but its association with the tubular extension 32 through which the inner end of the burner projects, produces a combustion device which is peculiarly suitable for the attainment of the object in view. A burner of the "injector" type results from this combination, provided the proper relation exists between the area of the end of the burner and the area of the annular opening between the extension 32 and the adjacent wall of the burner tube. Air in sufficient quantity to produce a satisfactory gaseous mixture is supplied through the mixer 34; but the air that is sucked in through the tubular extension 32 promotes combustion within the combustion chamber to a maximum degree of efficiency. A peculiarity of these burners is that, unless a suitable flame arrester is located a proper distance from the end of the burner, the flame will be affected by the inrushing air from the extension 32, and either be carried by it too far away from the end of the burner, or it will be choked by the jacket of inrushing air that surrounds it, and fire back into the mixer 34. Therefore I have provided a flame arrester 105, for each of the burners 33, the arrester being of substantially semi-conical shape. Each arrester may be connected to the supporting plate or basin 8, by means of a stove bolt 106, as shown. Of course, when refuse is in the incinerator, it would act as an arrester for the flames, in the absence of the flame arresters 105; but, in case the burners are lighted before the refuse is deposited within the incinerator; or in case a quantity of the refuse adjacent the burner would become reduced to ashes and fall away before another supply of refuse would fall down to take its place; or when the last of a deposit of refuse is being consumed; without the provision of some means for arresting the flame, or for controlling it, the difficulty above set forth might be experienced.

The operation of the incinerator is as follows: When it is desired to deposit a quantity of refuse within the combustion chamber of the incinerator, the door 42 is swung open to the position shown in dotted lines in Fig. 2. During the opening of the door, the lugs 101 engage the extensions 100 of the arms 98, and swing the arms to the dotted line position in Fig. 2. During the elevation of the rear ends of the arms, the weights 90 are drawn downwardly to their lowest positions and at the same time, through the cables 93, the flue extension 94 is elevated to the upper end of the casing, where it is shown in dotted lines in Fig. 3. In this position the spider 95 is entirely out of the way of the material which is thrown into the incinerator. When the refuse has been deposited, the door is closed and the flue extension is permitted to drop until its spider 95 settles down upon the top of the mass or column of refuse. The accumulation of the refuse within the incinerator may continue until the same is full or slightly above the lower edge of the filling opening 44. Since the accumulation of such refuse as garbage is comparatively slow, disagreeable odors are apt to be liberated therefrom and be emitted into the room when the door is opened. In order to destroy or carry off these odors, the burners 46 may be lighted as has been previously stated.

To consume the refuse the lower burners 33 are lighted. Their products of combustion are projected about the flame arresters 105 and directly against the lower portion of the mass or column of refuse, said products then passing about the sides of the mass until they find an outlet from the passageway or flue $a$, through the port or opening $c$. Having gained a higher elevation through this port, the products of combustion flow around the sides of the mass of refuse to the front of the combustion chamber where they pass through the port $d$ to within the upper intermediate shell 74. Here they are again compelled to traverse the sides of the mass or column of refuse until they find an outlet through the port $f$ and the flue $g$ to the upper end of the combustion chamber. The only exit for the products of combustion being through the flue extension 94, said products are now compelled to flow downward into close proximity to the top of the mass of refuse before they can escape through the openings 96 to the flue extension. It will be stated at this time that preferably both the flues or pipes 85 and 19, and necessarily the latter, have connection with the flue or chimney of the building. Therefore, when the products of combustion flow on upward through the flue 85, the heat which is radiated from said flue or pipe, creates an upward draft in the pipe 19, causing cool air to be drawn in through the openings 20, thereby "air jacketing" the inner pipe 85 and greatly reducing the possibility of its radiating heat into the room.

The above description of the operation of the incinerator is based on the condition that the incinerator is practically full of refuse. Should the top of the mass of refuse extend only to within one of the intermediate shells, the flue extension will rest thereon and compel the products of combustion to flow inward over the top of the mass to where they escape through the openings 96 and the flue extension. From this it will be seen that regardless of the amount of refuse contained within the incinerator, the products of combustion will expend their fullest efficiency toward the consumption thereof before they are permitted to escape into the flue.

When the refuse has been reduced to ashes, the greater quantity of it will fall through the perforations in the plate or basin 8 and be caught by the ash pan 7. At any time it is found necessary to stir the mass of refuse for the purpose of bringing fresh matter to the surface or for causing the burnt particles to pass downward through the perforations in the supporting plate or basin, the door 30 may be opened and a poker inserted through the opening 29 for this purpose. The ash pan may be removed for emptying, through the opening 4 that is normally closed by the door 5.

The rapid and effectual consumption of wet garbage is assured by the fact that the products of combustion are caused to constantly lick the sides of the mass of refuse throughout its tortuous course through the incinerator. Attention is called to the fact, also, that there is no danger of the refuse becoming choked or tightly packed in the bottom of the incinerator for the reason that the extensions 77, 75, and 73 of the upper and intermediate shells 76, 74, and 72, respectively, gradually enlarge in diameter as they approach the bottom of the incinerator, thereby causing the mass of refuse to be slightly retarded or held back against a direct fall to the bottom of the combustion chamber, and this tends to maintain a more or less loose condition of the mass toward the bottom of the incinerator where it is acted upon directly by the products of combustion from the burners 33.

The fact that the burners 33 are located above the supporting plate or basin 8, it being remembered at the same time that refuse practically covers the plate or basin during the operation of the burners, it will be seen that there is no liability of the supporting plate or basin becoming burned out through the action of the burners 33.

The modification of my incinerator that is illustrated in Fig. 7 of the drawings, is identical in every essential respect to the portable type of incinerator above described. In this modification I have changed the construction of the incinerator only to the extent required to permit it to be built into the wall of a building. I have also modified the manner of elevating the flue extensions by the opening of the door. In Fig. 7 the flue extension is represented at 110, and the door at 111. It will be noted that this door is of considerable thickness at its upper end in order to secure sufficient weight to counterbalance the flue extension 110. In this form of my device, the arms 112, that are actuated by the door, are on the inside of the incinerator and have a pivotal connection with the lower edge of the door. The free ends of the arms are connected by links 113 to the sides of the spider 114. When the flue extension is in its lowest position, and the door is closed, the underneath edge of the arms 112 contact with the adjacent lower edge of the door. Therefore, when the door is opened, its lower edge will pry upward on the arms 112 and cause them to elevate the flue extension 110 to the upper end of the combustion chamber. When the door is closed, the flue extension is permitted to drop into contact with the mass of refuse, and be supported thereby at any elevation, the pivotal connection between the arms 112 and the door allowing this action.

The modification shown in Fig. 7 of the drawings differs further from the form shown in the preceding figures, by having an imperforate supporting plate 115 for the refuse. In the case of the incinerator being used in such institutions as hospitals, it is thought that this form of supporting plate or basin will be found preferable to the perforated type. This is because poisonous liquids and infectious secretions are so often present in the refuse which is collected from sick rooms. Such refuse as this should be retained under the direct influence of the active products of combustion from the burner, and not be permitted to fall down into the ash pan and accumulate there to slowly evaporate. The ash pan is nevertheless retained in this form of my incinerator, the compartment below the supporting plate answering as a convenient place to store the pan. When it is desired to clean out the incinerator, the pan may be withdrawn partially from its compartment and the ashes within the incinerator scraped out through the opening 29, into the pan.

While I have shown a very desirable embodiment of my invention in the accompanying drawings, I wish it to be understood that I do not limit myself to the construction therein illustrated, except as required by the terms of the annexed claims and the state of the prior art.

Having thus described my invention, what I claim is:—

1. In an incinerator, the combination of a supporting member for the refuse, a casing which incloses a combustion chamber thereabove, a combustion device that is arranged to discharge its products of combustion into the lower portion of the casing, means for maintaining a space between the wall of the casing and the adjacent surface of the mass of refuse through which space the products of combustion may rise, and further means whereby the elevation at which the products of combustion may escape from the combustion chamber is maintained in substantially the plane of the upper surface of the mass of refuse.

2. In an incinerator, the combination of a supporting member for the refuse, a casing which incloses a combustion chamber thereabove, a combustion device that is arranged to discharge its products of combustion into the lower portion of the casing, means for maintaining a space between the wall of the casing and the surface of the mass of refuse through which space the products of combustion may rise, and further means whereby the elevation at which the products of combustion may escape from the combustion chamber is automatically adjusted by the refuse within the casing.

3. In an incinerator, the combination of a supporting member for the refuse, a casing which incloses a combustion chamber above said supporting member, the walls whereof are provided with a vertically arranged series of substantially horizontal passageways which open into the combustion chamber and which communicate with each other through ports, the ports connecting successive pairs of passageways being staggered with respect to each other, a combustion device from which the products of combustion are directed into the lower portion of the combustion chamber from where they are permitted to pass upward through the aforesaid passageways and ports, and a flue extension which is capable of resting upon the mass of refuse and whereby the elevation at which the products of combustion escape from the combustion chamber is maintained at substantially the top surface of the refuse.

4. In an incinerator, the combination of a perforated supporting member for the refuse, a casing inclosing a combustion chamber above the supporting member the walls whereof are provided with a vertical series of substantially horizontal passageways which open into the combustion chamber and which communicate with each other through ports, the ports which connect successive pairs of passageways being staggered with respect to each other, a combustion device from which the products of combustion are directed into the lower portion of the combustion chamber above the refuse supporting member, and a flue extension which is capable of resting upon the mass of refuse and whereby the elevation at which the products of combustion escape from the combustion chamber is maintained constantly at substantially the top surface of the refuse.

5. In an incinerator, the combination of a supporting member for the refuse, a casing inclosing a combustion chamber above said supporting member, the casing having a flue opening at its upper end and having also a filling opening, a door hinged to the casing adjacent the last mentioned opening, a flue extension within the combustion chamber the lower end of which capable of resting upon the mass of refuse, and connections between said flue extension and the door whereby said extension will be elevated when said door is opened.

6. In an incinerator, the combination of a supporting member for the refuse, a casing inclosing a combustion chamber above said supporting member and having a flue opening at its upper end and having also a filling opening, a door hinged to the casing adjacent said filling opening, a flue extension which has its upper end guided within the aforesaid flue opening and its lower end capable of resting upon the mass of refuse, and connections whereby the opening of the door will elevate the flue extension.

7. In an incinerator, the combination of a supporting member for the refuse, a casing inclosing a combustion chamber above said supporting member and having a flue opening at its upper end and having also a filling opening, a door hinged to the casing adjacent said filling opening, a flue extension which has its upper end guided within the aforesaid flue opening and its lower end capable of resting upon the mass of refuse, counterbalancing weights for the flue extension, and connections whereby the opening of the door will elevate the flue extension.

8. In an incinerator, the combination of a supporting member for the refuse, a casing inclosing a combustion chamber above said supporting member and having a flue opening in its upper end and having also a filling opening, a door hinged to the casing adjacent the filling opening and adapted to close the same, a flue extension within the combustion chamber which has its upper end guided within the aforesaid flue opening and its lower end capable of resting upon the mass of refuse, a weight counterbalancing said flue extension, and connections between the weight and the door whereby the opening of the door will draw downward on the weight and elevate the flue extension.

9. In an incinerator, the combination of a supporting member for the refuse, a casing inclosing a combustion chamber above said supporting member and having a flue opening in its upper end and a filling opening, a door hinged to the casing adjacent the filling opening and adapted to close the same, a flue extension within the combustion chamber which has its upper end guided within the aforesaid flue opening and its lower end capable of resting upon the mass of refuse, a weight counterbalancing said flue extension, an arm which is swung by the opening of the door, and connections between the arm and the weight whereby the opening of the door will cause the weight to be moved downward and elevate the flue extension.

10. In an incinerator, the combination of a base frame, a bottom for said frame, a supporting member for the refuse supported by said base frame, a casing extending upward from the base frame, and having a flue opening, a series of shells which are superimposed above the base frame, certain of said shells having extensions which project downward into the next lower shells, said extensions and the walls of the shells being spaced apart to provide passageways therebetween, the shells having ports through which the passageways communicate with each other, the ports which connect successive pairs of passageways being staggered with respect to each other, the casing having a filling opening adjacent its upper end through which refuse may be introduced into the interior of the shells, a closure for said opening, and a combustion device which is arranged to discharge its products of combustion into the casing.

11. In an incinerator, the combination of a base frame, a bottom for said frame, an ash receptacle supported by said bottom, a supporting member for the refuse supported by said base frame above the ash receptacle, a casing extending upward from the base frame, a top for said casing having a flue opening that is located above the aforesaid supporting member, a series of shells which are superimposed above the base frame and supported thereby, certain of said shells having extensions which project downward into the next lower shells, the extensions and the walls of the shells being spaced apart to provide passageways therebetween, the shells having ports through which the passageways communicate with each other, the ports which connect successive pairs of passageways being staggered with respect to each other, the casing having a filling opening adjacent its upper end through which refuse may be introduced into the interior of the shells, a door for said opening which is hinged to the casing, a flue extension within the casing the upper end of which is guided within the aforesaid flue opening and the lower end of which is capable of resting upon the mass of refuse, a series of burners supported from the front wall of the casing and arranged to discharge their products of combustion into the casing above the refuse supporting member, a burner from which the products of combustion are directed into the upper end of the casing, and connections between the aforesaid door and the flue extension whereby the opening of the door will elevate said flue extension.

12. In an incinerator, the combination of a base, a supporting member for the refuse supported by said base, a casing extending upward from the base, a top for said casing having a flue opening that is located above the aforesaid supporting member, a series of shells which are superimposed above the base frame, certain of said shells having extensions which project downward into the next lower shells, the extensions and the walls of the shells being spaced apart to provide passageways therebetween, the shells having ports through which the passageways communicate with each other, the casing having a filling opening adjacent its upper end through which refuse may be introduced into the interior of the shells, a door for said opening which is hinged to the casing, a flue extension within the casing the upper end of which is guided within the aforesaid flue opening and the lower end of which is capable of resting upon the mass of refuse, a burner arranged to discharge its products of combustion into the casing above the refuse supporting member, a second burner from which the products of combustion are directed into the upper end of the casing, and connections between the aforesaid door and the flue extension whereby the opening of the door will elevate said flue extension.

13. In an incinerator, the combination of a base frame, a bottom for said frame, a perforated supporting member for the refuse supported by said base frame, a casing extending upward from the base frame, a top for said casing having a flue opening that is located above the aforesaid supporting member, the casing having a filling opening adjacent its upper end, a door for said opening which is hinged to the casing, a flue extension within the casing the upper end of which is guided within the aforesaid flue opening and the lower end of which is capable of resting upon the mass of refuse, a series of burners supported from the front wall of the casing and arranged to discharge their products of combustion into the casing above the refuse supporting member, a burner from which the products of combustion are directed into the upper end of the casing, and connections between the aforesaid door and the flue extension whereby the opening of the door will elevate said flue extension.

14. In an incinerator, the combination of a base frame, a bottom therefor, an ash receptacle supported by said bottom, a perforated supporting member for the refuse which is supported within the base frame, a casing rising from the frame the walls whereof are composed of spaced metal plates between which is a layer of insulating material, the casing having a filling opening, a top for the casing having a flue opening which is surrounded by a pair of radially spaced flanges, a flue pipe connected to each of said flanges, the outer of which is arranged to receive air at its lower end, a series of superimposed shells within the casing supported by the base frame certain of which have extensions that project downwardly into the upper ends of the next lower shells, the diameter of the extensions of the successive shells increasing in diameter toward the aforesaid refuse supporting member, a flue extension within the casing which has its upper end guided within the aforesaid flue opening and the lower end of which is capable of resting upon the mass of refuse, a pair of weights one of which is guided vertically on each side of the exterior of the casing, connections between the flue extension and the weights, a door pivoted to the casing and adapted to close the filling opening therein, connections between the door and the weights whereby the opening of the door will depress the weights and elevate the flue extension, and two series of burners one of which is arranged to discharge its products of combustion into the casing above and in proximity to the refuse supporting member and the other of which discharges its products of combustion into the upper end of the casing.

15. An incinerator comprising, in combination, a casing inclosing a combustion chamber in which a mass of refuse is adapted to be deposited, a burner tube that projects through the wall of said casing and is arranged to direct its products of combustion into said mass, a sleeve surrounding said burner tube and spaced radially therefrom, thereby to admit a jacket of air about the jet of gas issuing from the burner tube, and a flame arrester located within the combustion chamber in a position to arrest the flame from the burner and to prevent refuse from accumulating between it and said burner.

16. An incinerator comprising, in combination, a casing inclosing a combustion chamber in which a mass of refuse is adapted to be deposited, said casing having a burner opening, a burner tube projecting through said opening, and forming with the edge thereof a restricted air inlet, thereby to admit a jacket of air about the jet of gas issuing from the burner tube, and a flame arrester located within the combustion chamber in a position to arrest the flame from the burner and to prevent refuse from accumulating between it and said burner.

17. In an incinerator, the combination of a supporting member for the refuse, a casing extending upward therefrom and comprising a series of shells, certain of which have extensions that project downward into the next lower shells, said extensions and the walls of the shells being spaced apart to provide passageways therebetween, the shells having ports through which the passageways communicate with each other, the ports which connect successive pairs of passageways being staggered with respect to each other, and a combustion device which is arranged to discharge its products of combustion into the casing.

18. In an incinerator, the combination of a supporting member for the refuse, a casing extending upward therefrom and comprising a sectional shell having a vertical series of extensions which project inward and downward from its inner surface, thereby to provide passageways between said extensions and the wall of the shell, the shell extensions having ports through which the passageways communicate with each other, the ports which connect successive pairs of passageways being staggered with respect to each other, and a combustion device which is arranged to discharge its products of combustion into the casing.

In testimony whereof, I hereunto affix my signature in the presence of two witnesses.

FRANK A. NIEBERDING.

Witnesses:
BRENNAN B. WEST,
IRENE L. STOHLMAN.

Copies of this patent may be obtained for five cents each, by addressing the "Commissioner of Patents, Washington, D. C."